July 14, 1931. H. E. IVES 1,814,701
METHOD OF MAKING VIEWING GRATINGS FOR RELIEF OR STEREOSCOPIC PICTURES
Filed May 31, 1930
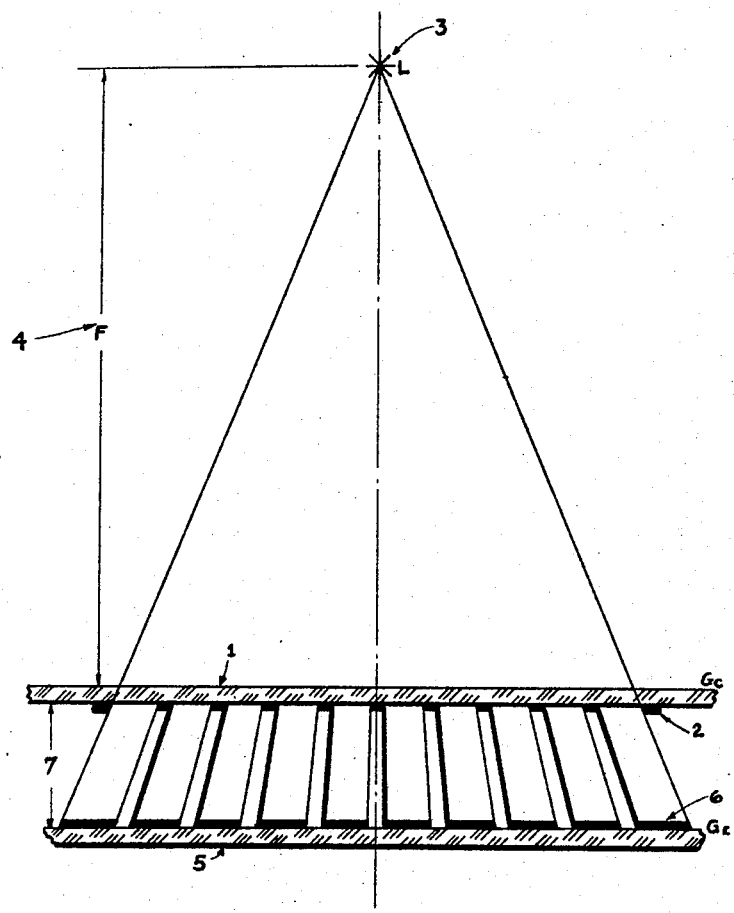
INVENTOR
Herbert E. Ives
BY Harry Lea Dodson
ATTORNEY Patented July 14, 1931

1,814,701

UNITED STATES PATENT OFFICE

HERBERT E. IVES, OF MONTCLAIR, NEW JERSEY, ASSIGNOR TO THE PERSER CORPORATION, OF NEW YORK, N. Y., A CORPORATION OF NEW YORK

METHOD OF MAKING VIEWING GRATINGS FOR RELIEF OR STEREOSCOPIC PICTURES

Application filed May 31, 1930. Serial No. 458,304.

My invention relates to that class of pictures described in my copending application, Serial No. 458,303, in which I have set forth a method making stereoscopic pictures which I have termed "parallax panoramagrams", meaning thereby pictures showing stereoscopic relief through a wide range of distances and angles of observation.

As set forth in said application, I have discovered that in order to avoid moiré patterning of the multiplicity of strip images formed on the photographic plate, by exposing the plate through a grating composed of alternate opaque and transparent vertical lines, and viewing by the aid of a grating placed on the side away from the eyes, it is absolutely essential that the spacing of the lines in the viewing grating be greater than in the taking grating.

My present invention has for its object, to provide a method of making such viewing gratings, so that it will furnish correct spacing for the viewing grating, when used in the manner described by which to obtain a true stereoscopic picture free from moiré patterning.

Referring to the accompanying drawing, to be considered as a part of this specification, wherein I have illustrated the method to be followed in carrying out my invention,—

The figure is a diagrammatic view showing my improved method of making viewing gratings.

Similar reference numerals refer to similar parts throughout the entire description.

I have discovered that the most satisfactory way of making these viewing gratings is by a photographic printing process. As shown in the drawing, I use a plate 1, which carries on its face a grating 2, this grating 2 constituting a complementary grating to the taking grating through which the relief or stereoscopic picture was made, that is, one with narrow opaque spaces and wide clear spaces, but having the same distance between line centers as the taking grating. This plate 1 is located at a predetermined distance from a point light source 3, the distance line 4 being equal to the distance between the taking grating 2 and the large lens of the camera (not shown) by means of which the relief picture was made in exposing the negative.

Beyond the plate 1 I mount a sensitive plate 5, having its emulsion side 6 turned toward the light source 3. This plate 5 is separated from the plate 1 by a space 7, which is twice the distance between the taking grating 2 and the sensitive plate (not shown) used in making the relief picture which is to be viewed through the viewing grating produced in accordance with my method. The result of this arrangement will be, that the diverging of the light beams in the space between the grating 2 and the plate 5 will provide the necessary magnification.

While for purposes of explanation it is simplest to describe the distances used for copying gratings by this method, as being respectively equal to the distance between large lens and plate, and twice the separation between grating and plate, it is in fact only necessary that the ratio of distances be such as to give the desired magnification. The most general statement, accordingly, is that the space 7 must bear the same ratio to the distance 4, that the distance F used in taking does to twice the separation used in taking.

While it is preferable to expose the sensitive plate on which it is desired to obtain the viewing grating, through a complementary grating, as described, it is also possible, if such a complementary grating is not available, to make the exposure through the grating used in taking, or a similar one, thereby obtaining a grating complementary to the desired viewing grating, from which complementary viewing grating correct viewing gratings may be made by contact printing. Or, the complementary viewing grating may be subjected to any of the well known developing procedures which produce a photographic reversal, whereby the developed print will have the desired wide opaque and narrow transparent spaces.

Although the viewing grating manufactured in this way will differ from the taking grating 2, through which the exposure was made, only by a few lines across its whole width, this difference is absolutely necessary, and will entirely avoid any tendency toward the occurrence of moiré patterning, which invariably occurs where a viewing grating identical with the taking grating is employed.

Having described my invention, what I regard as new, and desire to obtain by Letters Patent of the United States, is:

1. The method of making gratings for viewing relief or stereoscopic pictures, made by the use of a large stationary lens, consisting of exposing to a substantially punctiform light source a sensitive plate, and causing the light rays to pass through a grating complementary in its spacing to the grating used in taking the relief picture negative, the distance between the light source and complementary grating bearing the same ratio to the distance between the grating and the sensitive plate, as the distance between the taking grating and the lens of the camera which made the picture to be viewed, bore to twice the distance between the taking grating and the negative plate when the picture was made.

2. The method of making gratings for viewing relief or stereographic pictures, made by the use of a large stationary lens, consisting of exposing to a substantially punctiform light source a sensitive plate, and causing the light rays to pass through a grating identical in its spacing with that of the grating used in taking the relief picture negative, the distance between the light source and grating bearing the same ratio to the distance between the grating and the sensitive plate, as the distance between the taking grating and the lens of the camera which made the picture to be viewed, bore to twice the distance between the taking grating and the negative plate when the picture was made, and subsequently subjecting the exposed sensitive plate to a photographic printing process.

3. The method of making gratings for viewing relief or stereoscopic pictures, consisting of exposing to a substantially punctiform light source a sensitive plate, spaced therefrom a distance equal to the distance between the taking grating and the lens of the camera which made the picture to be viewed, and causing the light rays to pass through a grating complementary in its spacing to the taking grating, said complementary grating being spaced from the sensitive plate a distance double the distance which separated the taking grating and the picture plate when the picture was made.

4. The method of making gratings for viewing relief or stereoscopic pictures, consisting of exposing to a substantially punctiform light source a sensitive plate, spaced therefrom a distance equal to the distance between the taking grating and the lens of the camera which made the picture to be viewed, and causing the light rays to pass through a grating, complementary, in its relation of opaque to transparent portions, to the taking grating, said complementary grating being spaced from the sensitive plate a distance approximately double the distance which separated the taking grating and the picture plate when the picture was made.

HERBERT E. IVES.